US008717367B2

(12) United States Patent
Clifton et al.

(10) Patent No.: US 8,717,367 B2
(45) Date of Patent: *May 6, 2014

(54) AUTOMATICALLY GENERATING AUDIOVISUAL WORKS

(75) Inventors: Stephen J. Clifton, Jersey City, NJ (US); Jason R. Hsiao, New York, NY (US); Bradley C. Jefferson, San Francisco, CA (US); Thomas M. Clifton, Boston, MA (US)

(73) Assignee: Animoto, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/481,214

(22) Filed: May 25, 2012

(65) Prior Publication Data

US 2012/0236005 A1    Sep. 20, 2012

Related U.S. Application Data

(63) Continuation of application No. 11/681,679, filed on Mar. 2, 2007.

(51) Int. Cl.
*G06F 3/00*    (2006.01)

(52) U.S. Cl.
USPC .......................... 345/473; 715/730; 715/723

(58) Field of Classification Search
None
See application file for complete search history.

(56) References Cited

U.S. PATENT DOCUMENTS

| 6,369,835 B1 | 4/2002 | Lin |
| 6,639,649 B2 | 10/2003 | Fredlund |
| 6,686,970 B1 | 2/2004 | Windle |
| 7,142,645 B2 * | 11/2006 | Lowe .......................... 379/88.16 |
| 7,454,077 B1 * | 11/2008 | MacKenzie et al. .......... 382/250 |
| 2003/0085913 A1 * | 5/2003 | Ahmad et al. ................ 345/730 |
| 2004/0027369 A1 * | 2/2004 | Kellock et al. ............... 345/716 |
| 2004/0085341 A1 | 5/2004 | Hua et al. |
| 2004/0113933 A1 | 6/2004 | Guler |
| 2004/0190063 A1 | 9/2004 | Brown |
| 2005/0044499 A1 | 2/2005 | Allen et al. |
| 2005/0273331 A1 * | 12/2005 | Lu ................................ 704/246 |

(Continued)

FOREIGN PATENT DOCUMENTS

| DE | 103 04 098 | 8/2006 |
| EP | 1 083 567 A2 | 3/2001 |
| WO | WO 2004/068495 | 8/2004 |

OTHER PUBLICATIONS

Paradiso, et al An Algebra for Combining MPEG-4 Compliant Facial Animations, Online Proceedings, PRICA Intl Workshop on Lifelike Animated Agents: Tools, Affective Functions, and Applications, Prendinger H. (Ed.), Tokoyo, JP, Aug. 19, 2002.*

(Continued)

*Primary Examiner* — Ulka Chauhan
*Assistant Examiner* — Patrick F Valdez
(74) *Attorney, Agent, or Firm* — Hickman Palermo Truong Becker Bingham Wong LLP; Adam C. Stone

(57) ABSTRACT

In one embodiment, a method comprises inferentially selecting one or more design animation modules based upon analysis of information obtained from digital visual media items and digital audio media items; and automatically creating an audiovisual work using the selected design animation modules. Audiovisual works can be automatically created based upon inferred and implicit metadata including music genre, image captions, song structure, image focal points, as well as user-supplied data such as text tags, emphasis flags, groupings, and preferred video style.

30 Claims, 10 Drawing Sheets

(56) References Cited

U.S. PATENT DOCUMENTS

| | | | |
|---|---|---|---|
| 2005/0275805 A1 | 12/2005 | Lin et al. | |
| 2006/0020880 A1 | 1/2006 | Chen | |
| 2006/0041632 A1* | 2/2006 | Shah et al. | 709/217 |
| 2007/0028264 A1 | 2/2007 | Lowe | |
| 2007/0038931 A1 | 2/2007 | Allaire et al. | |
| 2007/0038938 A1* | 2/2007 | Canora et al. | 715/731 |
| 2007/0118800 A1 | 5/2007 | Moore et al. | |

OTHER PUBLICATIONS

"PhotoStory 3 Tutorial", URL: http://www.Microsoft.com/windowsxp/using/digitalphotography/photostory/default.mspx, Feb. 2007.*

Kazai, et al "Using Metadata to Provide Synchronised and Scalable Broadcast and Internet Content and Services", WIAMIS Workshop, London, pp. 487-492, 2003.*

"FotoTagger Help", [online], [retrieved Aug. 17, 2012], URL: http://www.fototagger.com/help/fototagger_help.htm, Oct. 18, 2006.*

"Making QuickTime Slideshow with Music", [online], [retrieved Aug. 21, 2012], URL: http://www.youtube.com/watch?v=WD1oe6xMZWQ, Oct. 14, 2006.*

Voida, et al "Listening In: Practices Surrounding iTunes Music Sharing", CHI 2005, Apr. 2-7, 2005.*

Chen, et al "Tiling Slideshow", MM'06, Oct. 23-27, 2006.*

"IncrediFlash Xtreme", [online], [retrieved Aug. 7, 2012], URL: http://www.incrediflahs.com/ifl.html, Jan. 2007.*

"Wedding Photo Montage", [online], [retrieved Aug. 23, 2012], URL: http://www.youtube.com/watch?v=Hgfv-bZGgK8, Feb. 28, 2007.*

"Webgallery in New Zealand", [online], [retrieved Aug. 23, 2012], URL: http://www.webgallery.co.nz/order.htm, Feb. 5, 2007.*

Hua, et al "Interactive Video Authoring and Sharing Based on Two-Layer Templates", Proceedings, HCM'06, pp. 65-74, 2006.*

"YouTube to start revenue-sharing at Blog.Jiboneus", [online], [retrieved Aug. 23, 2012], URL: http://blog.jiboneus.com/2007/01/29/youtube-to-start-revenue-sharing, Jan. 29, 2007.*

"Tutorial for 3D Photo Montage Templates", URL: http://www.3dtime.com/tutorial/montage.index.html, [online], [retrieved Aug. 26, 2012], Aug. 16, 2006.*

"Slideroll: Frequently Asked Questions", [online], [retrieved Aug. 24, 2012], URL: http:web.archive.org/web/20070212023421/http://.slideroll.com/faq.php, Feb. 12, 2007.*

VanderMolen, J. "How To Create Slideshows with the Free PhotoStory 3", [online], [retrieved Aug. 7, 2012], Jan. 1, 2007, URL: http://www.techlearning.com/article/44023.*

"Firefox 2", [online], [retrieved Aug. 26, 2012], URL: http://web.archive.org/web/20070216155006/http://www.mozilla.com, Feb. 16, 2007.*

"You Tube: Tech Talk Visits Slideroll", [online], [retrieved Aug. 24, 2012], Jun. 18, 2006, URL: http://www.youtube.com/watch?v=SvqpxmVQ4Os.*

Dannenberg, R. B. "Toward Automated Holistic Beat Tracking, Music Analysis, and Understanding", ISMIR 2005 6th Intl. Conf. on Music Information Retrieval Proceedings, London: Queen Mary, University of London, 2005.*

Belrose, et al "Method and Apparatus for Large-Scale Personalized Content Creation Using a Remote Content Creation Utility Service", Research Disclosure RD503073, ISSN 0374-4353, Mar. 2006.*

Young, L., "Patent Cooperation Treaty PCT International Search Report and Written Opinion," issued by USPTO as International Searching Authority and published by Intl Bureau of WIPO, Geneva, Switzerland, Jul. 25, 2008 (7 pages).

"Notification Concerning Transmittal of International Preliminary Report on Patentability" received in corresponding International application No. PCT/US08/53825, Sep. 17, 2009 (8 pages).

Current Claims in corresponding International application No. PCT/US08/53825 dated Oct. 2009(10 pages).

European Communication received in Application No. 08729744.6 dated Apr. 18, 2012 (8 pages).

European Current Claims in Application No. 08729744.6, dated Apr. 2012 (12 pages).

Hua X et al. "Interactive Video Authoring and Sharing Based on Two-Layer Templates", dated Jan. 1, 2006 (10 pages).

Hua X et al., "AVE—Automated home Video Editing", dated Nov. 1, 2003, XP007920228 dated Nov. 4, 2003 (8 pages).

* cited by examiner

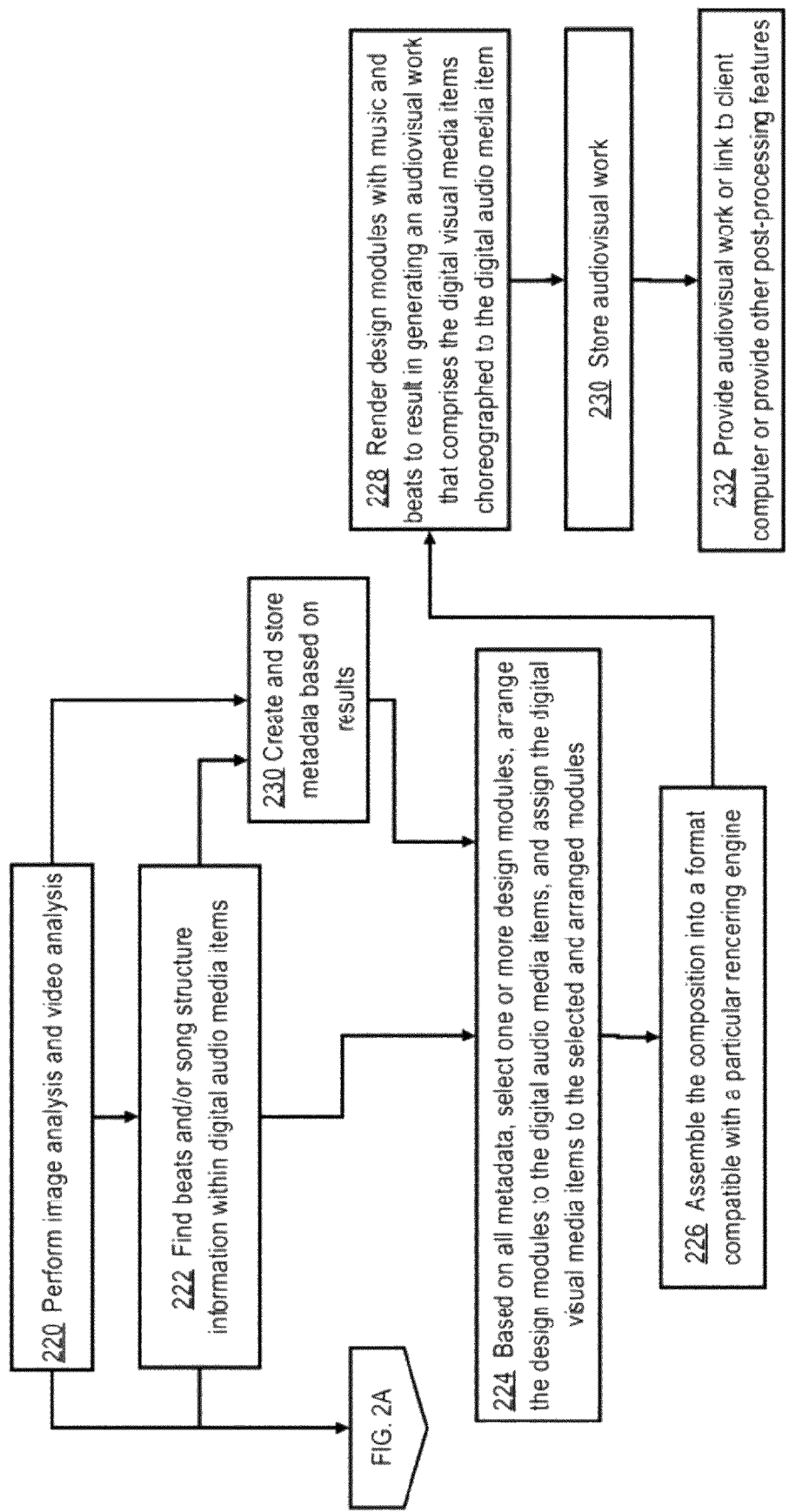

AUTOMATICALLY GENERATING AUDIOVISUAL WORKS

PRIORITY CLAIM

This application claims the benefit as a Continuation of application Ser. No. 11/681,679, filed Mar. 2, 2007, the entire contents of which is hereby incorporated by reference as if fully set forth herein, under 35 U.S.C. §120. The applicant(s) hereby rescind any disclaimer of claim scope in the parent application(s) or the prosecution history thereof and advise the USPTO that the claims in this application may be broader than any claim in the parent application(s).

FIELD OF THE INVENTION

The present disclosure generally relates to creating digital audiovisual works.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Digital photography is now widely used both by consumers and businesses. Many individuals now maintain large libraries of stored digital images or digital video on personal computers or on networked storage using online services. Digital music is also now widely available and many individuals own or have licensed the use of digitized songs, have prepared their own digital musical compositions, or have legal access to music on the Internet.

In the commercial media, music videos that combine music with still images or moving pictures have been popular for some time. Many consumers wish to create personal music videos based on their own digital images and using either commercial music or original musical compositions. At present, however, the tools available to consumers for creating music videos have been technically complex and difficult to use. Typically a consumer must install, learn and operate complicated software on a personal computer to combine music and images into an audiovisual work. The process is generally time-consuming and difficult, and can be impossible for some users.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2B illustrates further steps in the process of FIG. 2A;

DETAILED DESCRIPTION

Figure 1A:
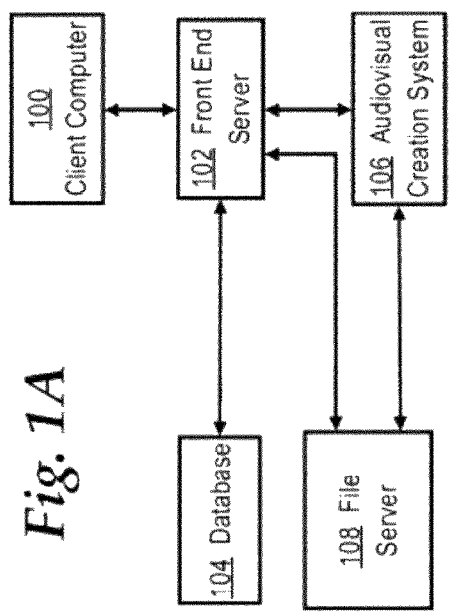
FIG. 1A illustrates a networked computer system for use in automatically creating audiovisual works using inferential analysis of metadata.

Automatically creating audiovisual works is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:
   1.0 General Overview
   2.0 Structural Overview
   3.0 Functional Overview
      3.1 Composer Process
      3.2 Director Process
      3.3 Editor Process
      3.4 Online Service Implementation
   4.0 Implementation Mechanisms—Hardware Example
   5.0 Extensions and Alternatives

1.0 GENERAL OVERVIEW

In one aspect, a method comprises receiving one or more digital visual media items; receiving one or more digital audio media items; automatically selecting and arranging one or more design modules based upon analysis of information obtained from the digital visual media items and the digital audio media items; and automatically creating an audiovisual work by rendering the selected and arranged design modules.

Audiovisual works can be automatically created based upon inferred and implicit metadata including music genre, image captions, song structure, image focal points, as well as user-supplied data such as text tags, emphasis flags, groupings, and preferred video style.

In another aspect, a computer system comprises logic encoded in one or more storage media for execution and when executed operable to: receive one or more digital visual media items; receive one or more digital audio media items; obtain one or more first metadata values from the digital visual media items and the digital audio media items; inferentially select and arrange one or more of the design modules, based on the first metadata values; create an audiovisual work by arranging the selected and arranged design modules.

In one feature, the system further comprises a plurality of design modules for portions of an audiovisual work, and each design module comprises timing information, and one or more second metadata values of attributes of that design module. In another feature, the logic operable to obtain the first metadata values does not obtain the first metadata values based upon user input, and the logic operable to select one or more of the design modules does not select the one or more design modules based upon user input.

In yet another feature, the logic is operable to automatically re-time one or more of the selected design modules to the digital audio media items. In another feature, one of the digital visual media items is a digital video file. In yet another feature, the logic when executed is operable to analyze the digital audio media items to identify one or more beat points and song structure attributes of the digital audio media items, and to obtain the first metadata values at least in part based upon any of the beat points or the song structure attributes.

In a further feature, the logic when executed is operable to analyze the digital audio media items to identify any of a ramp-up period, climactic point, verse, chorus, bridge, genre, or style attributes of the digital audio media items, and to obtain the first metadata values at least in part based upon any of the attributes. In another feature, the logic when executed is operable to analyze the digital visual media items to identify one or more focal points, image characteristics, or image metadata values, and to obtain the first metadata values at least in part based upon any of the focal points, image characteristics or image metadata values.

In still another feature, the logic when executed is operable to analyze the digital visual media items to identify one or more of a face, subject, hue, saturation, orientation, brightness, contrast, title, or captions and to obtain the first metadata values at least in part based upon any of the face, subject, hue, saturation, orientation brightness, contrast, title, or captions.

In another feature, the logic when executed is operable to obtain information indicating that one or more specified digital visual media items should be emphasized or grouped in an audiovisual work, and to generate the audiovisual work comprising modules that would allow the digital visual media items or digital visual media item groupings to align with structure attributes in the digital audio media items. In another feature, the logic when executed is operable to obtain one or more text values associated with a collection of the digital visual media items, and to select the one or more design modules based in part upon a similarity of the one or more text values to the second metadata values.

In still another feature, the logic when executed is operable to obtain a preferred style of the audiovisual work, and to select the one or more design modules based in part upon a similarity of the preferred style to the second metadata values. In another feature, the logic when executed is operable to determine a genre of the digital audio media items, to obtain a preferred style of the audiovisual work, and to select the one or more design modules based in part upon a similarity of the second metadata values to all of the genre, preferred style and the first metadata values.

In another feature, the logic when executed is operable to select one or more of the design modules and to generate the audiovisual work in which the selected design modules are layered. In a further feature, the logic when executed is operable to determine a starting point in the digital audio media items, and to arrange the selected design modules to the digital audio media items beginning at the specified starting point.

In another aspect, a method comprises providing one or more digital visual media items to an online server; providing one or more digital audio media items to the online server; requesting the online server to generate an audiovisual work based on the digital visual media items and the digital audio media items; receiving the audiovisual work; wherein the audiovisual work has been generated based on a plurality of design modules for portions of an audiovisual work and comprises the design modules selected and arranged to the digital audio media items, wherein each design module comprises timing information and one or more second metadata values of attributes of that design module, determining one or more first metadata values from the digital visual media items and the digital audio media items, selecting and arranging one or more of the design modules based on the first metadata values and the second metadata values.

In another aspect, a method comprises receiving one or more digital visual media items; receiving one or more digital audio media items; obtaining one or more metadata values from any of the design modules, the digital visual media items, the digital audio media items, user input, algorithmic extraction, statistical extraction, or an auxiliary data source; selecting and arranging one or more of the design modules, based in part on the metadata values; creating an audiovisual work comprised of the design modules selected and arranged to the digital audio media items.

In other embodiments, the invention encompasses a method and a computer-readable medium configured to implement the foregoing features. Other methods, aspects and features will become apparent from the complete disclosure and claims.

2.0 STRUCTURAL OVERVIEW

Figure 1B:
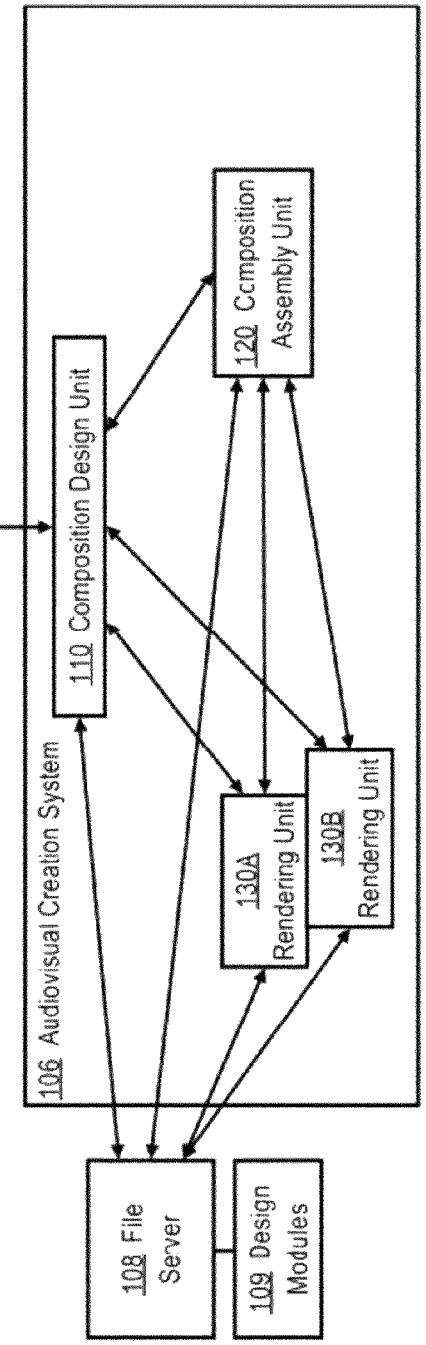
FIG. 1B illustrates internal organization of a production system for audiovisual works.

FIG. 1A illustrates a computer system for use in automatically creating audiovisual works; FIG. 1B illustrates internal organization of a production system for audiovisual works. Referring first to FIG. 1A, in one embodiment, a client computer 100 is coupled directly or indirectly through one or more networks to a front end server 102. The front end server 102 is coupled to a database 104 and to an audiovisual creation system 106. A file server 108 is coupled to the front end server 102 and to the audiovisual creation system 106. File server 108 may comprise one or more storage devices, a storage subsystem, a SAN, or other storage. The front end server 102, database 104, audiovisual creation system 106, and file server 108 may be co-located at a service provider and the client computer may be located remote from the service provider over a network. Within the service provider, a network may be used to connect the front end server 102, database 104, audiovisual creation system 106, and file server 108.

In an embodiment, client computer 100 comprises a personal computer, workstation, or other end station that hosts an HTML browser. Requests from client computer to the front end server 102 may use Ajax. Alternatively, client computer 100 comprises a mobile phone, handheld computer, set-top box, or any other computing device that can deliver digital visual media items or digital audio media items to front end server 102.

In still another alternative, client computer 100 may comprise a system or server that independently identifies digital visual media items and digital audio media items to front end server 102 or audiovisual creation system 106. For example, client computer 100 may be associated with a search engine system and may be configured to generate search results of digital visual media items and digital audio media items in response to a search request. The client computer may be configured to deliver the digital visual media items and digital audio media items to the front end server or audiovisual creation system 106 automatically, or in response to user selection of particular digital visual media items and digital audio media items from within the search results.

The front end server 102 may comprise an HTTP server, such as the Apache server, configured with additional executable programs, scripts, or a combination thereof to implement front-end functions. In an embodiment, front-end functions include receiving and storing user profiles; loading past projects; interfacing with online photo sites; downloading images; delivering image thumbnails to client computer 100; providing full-resolution images to audiovisual creation system 106; and communicating with file server 108 to store digital visual media items and digital audio media items.

In an embodiment, front end server 102 communicates with database 104 using SQL and the database is a SQL database, such as Oracle 9i, Microsoft SQL Server, etc. In an embodiment, database 104 stores a list of all design modules 109 that have been used to produce each completed audiovisual work, in the form of an XML document or other list. Design modules 109 are described further herein. The database 104 also may store a cached copy of metadata for songs that the system has previously downloaded during analysis of user-specified or user-provided songs, such as cached data from the CDDB CD information database. The database 104 also may store descriptive metadata for completed audiovisual works such as names, style tags, descriptions, etc.

File server 108 stores media items including digital visual media items and digital video, digital audio media items or other digital sound items, completed audiovisual works, and may also store descriptive information about any of the foregoing. In the description herein, the term "digital visual media item" refers to any of digital images and digital video, and the terms "digital image," "digital video," "photo," and "media item" are interchangeable except when a particular description or its context expressly relates to a specific attribute or use of video or a still image. The terms "digital audio media items" refers to any digital audio item or digital sound item in any form of digital storage. Examples of digital audio media items include digital music, digital songs, digital spoken audio, etc. One digital audio media item also may comprise multiple digital audio media items that are concatenated together.

Referring now to FIG. 1B, in an embodiment audiovisual creation system 106 comprises a composition design unit 110, a composition assembly unit 120, and one or more other rendering units 130A, 130B. Composition design unit 110 may expose an application programming interface (API) to front-end server 102 for invoking functions of the audiovisual creation system. The use of an API to interface front-end server 102 to composition design unit 110 enables the composition design unit to receive calls or requests from systems or services other than the front-end server, such as third party sites or services.

In an embodiment, composition design unit 110 is configured with executable programs, scripts, or a combination thereof to prepare instructions for the composition assembly unit and the rendering units. Based on these instructions, the composition assembly unit prepares data for the rendering units and instructs the rendering units how to render the completed audiovisual work. In an embodiment, composition design unit 110 is configured to perform media massaging, selection and arranging of design modules 109, music analysis, and final composition.

In various embodiments, composition design unit 110 may be hosted on different hardware than composition assembly unit 120, which may be on different hardware than rendering units 130A, 130B. Alternatively, all such units may be hosted on or comprise the same hardware platform. The units may be within the same local network or distributed.

In an embodiment, rendering units 130A, 130B and composition assembly unit 120 communicate status updates to composition design unit 110. The composition assembly unit 120 may comprise a controller service. The other rendering units 130A, 130B each may comprise a controller service and a render engine. In one embodiment, the composition assembly unit is a set of scripts that control the Blender animation software (www.blender.org). In one embodiment, the render engine is Blender's internal renderer. Alternatively, the render engine may comprise Renderman, Pixie, After Effects Render Engine, etc. Controller services on the rendering units 130A, 130B communicate using remote procedure calls. Further, composition design unit 110 requests the composition assembly unit 120 to assemble the composition and causes rendering units 130A, 130B to initiate rendering a video by storing an instruction file in a server folder that is being monitored by the controller service or by issuing an RPC call to the controller service.

3.0 FUNCTIONAL OVERVIEW

Figure 2A:
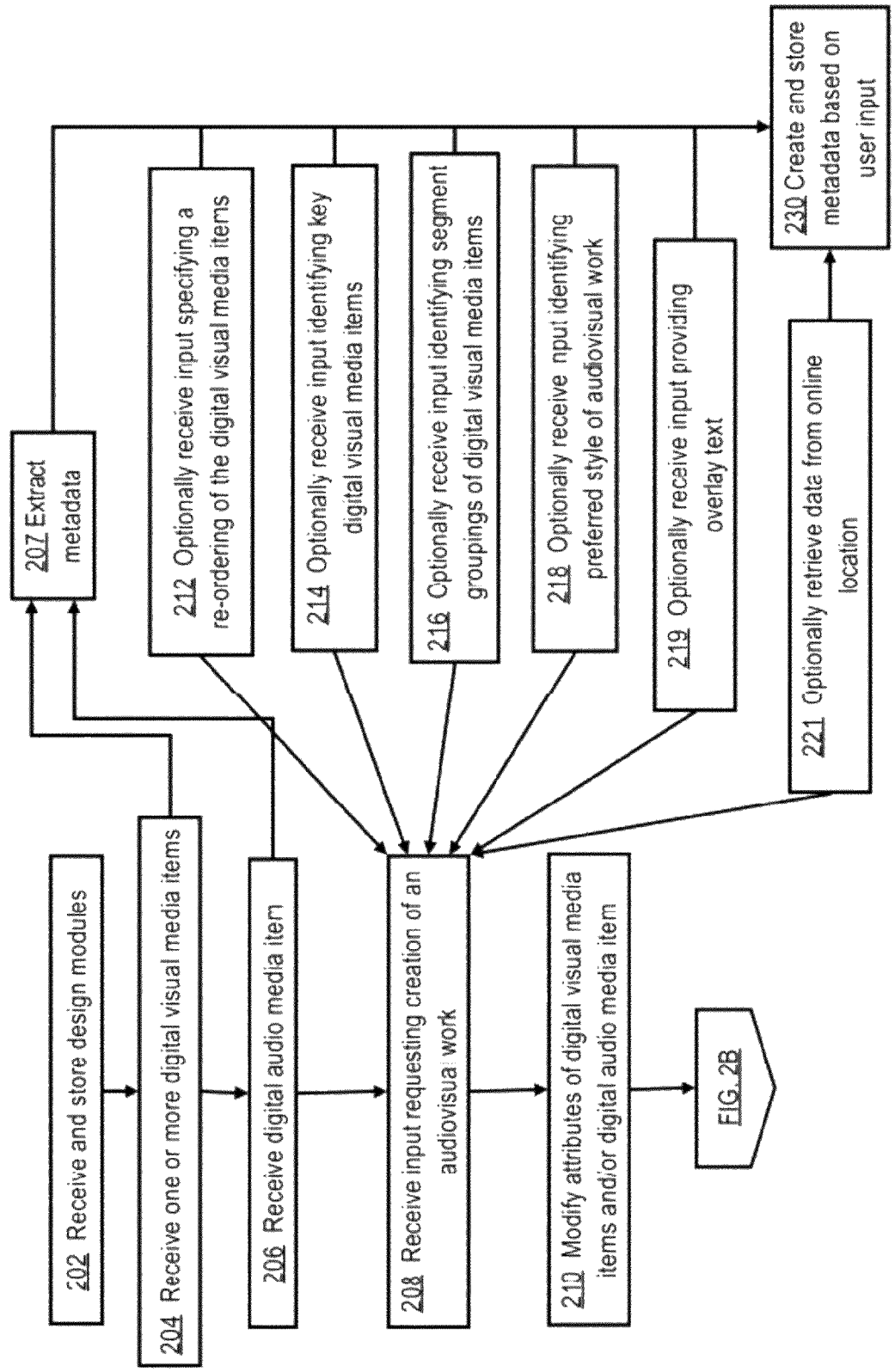
FIG. 2A illustrates an example process of automatically creating audiovisual works.

FIG. 2A illustrates an example process of automatically creating audiovisual works; FIG. 2B illustrates further steps in the process of FIG. 2A.

Referring first to FIG. 2A, in step 202, render design modules are received and stored. In an embodiment, a large plurality of render design modules 109, on the order of several thousand, are stored on file server 108. In an embodiment, each of the design modules 109 is created in a third-party application program. Example application programs that can be used to create design modules include professional animation programs such as Blender, Maya, Adobe After Effects, or a proprietary system. In an embodiment, each module comprises a "scene" as used in Blender. However, other embodiments may use different applications for design module creation and Blender is not required.

Each of the render design modules 109 may accept a range of digital visual media items. For example, different design modules 109 may be associated with images that are in portrait orientation or landscape orientation. Each design module 109 may comprise one or more digital media placeholders that are later replaced with user-supplied images or video. Each design module 109 is an independent interchangeable unit, comprising a unit that is combined with others to form a composition and is self-contained enough to be easily rearranged, replaced, or interchanged to form different compositions.

In an embodiment, each design module 109 is created separate from the process of FIG. 2A by a designer and incorporates one or more media files and associated timing information (e.g. beat points that the design technique is timed to). Each module may represent a particular kind of video effect or technique, and can have a length as short as one beat or as long as an entire song. Thus, design modules are not limited to defining transition effects or ways of moving linearly from one media item to the next or how media items interact during overlap. Modules herein can permit multiple media to appear in a video at the same time using techniques such as layering, 3d depth effects, etc.

In an embodiment, within design modules, media items can be layered, positioned in three-dimensional space, and allowed to appear at the same time in a non-linear fashion. The use of layers is not required, however. Design modules also can comprise helper design modules that provide secondary effects such as filters, other media, and other visual effects. In an embodiment, dozens of design modules are layered for use in creating an audiovisual work. Each design module is remappable to different beat timing information. In an embodiment, design modules 109 can appear in a composition at the same time using foreground, featured and background layers. In an embodiment, the featured module comprises the subject image(s) in a composition. The foreground and background module layers are comprised of helper design modules.

Design modules 109 may be tagged with keywords that describe the design module style so that subsequent process steps can match design modules to a style requested by the user based on input provided at step 218 as described below. In an embodiment, data associated with design modules includes: timing information (2 beats, 4 beats, no beats); orientation; style; correlated musical genres; rating; family; attack; and decay. In an embodiment, rating values range from 1-10 and are used for favoring certain design modules over others, as described further herein; any range of values can be used. In an embodiment, family values can group similar types of design modules into families. In an embodiment, attack values indicate how strong the design module comes up and decay values indicate how dramatic the fall-off is. Values of 1-3 may be used for attack and decay in an embodiment.

In step 204, one or more digital visual media items are received. In an embodiment, a user of client computer 100 interacts with a graphical user interface that is generated and provided by front end server 102 to a browser at client computer, and uploads digital visual media items one at a time or in batches. Step 204 also may involve reviewing and deleting digital visual media items that have been uploaded.

Step 204 may be preceded or supplemented by a registration process in which information about a user of client computer 100 is requested, received and recorded in the database as a user profile record or the equivalent.

At step 207, metadata is extracted from the one or more digital audio media items and digital visual media items. Extracting metadata from the media items is described further herein in connection with step 230. Generally, step 207 may comprise extracting one or more values from tags, captions, text, or other information contained in the digital media items. The extracted metadata is stored at step 230, which is further described herein.

In step 206, a digital audio media item is received. In an embodiment, the user of the client computer interacts with the graphical user interface to upload digital audio media item tracks or to select existing digital audio media item tracks that are already stored on file server 108. In an embodiment, the process can display a list of recommended song selections for the current user based on metadata associated with past audiovisual works that the same user has created. In an embodiment, the process can enable the user to request and receive a preview of the selected song. For example, a 30-second preview playback can be provided so that the user can decide whether the selected song is appropriate.

Step 206 also may comprise receiving multiple digital audio media items that can be concatenated together in the completed audiovisual work.

Figure 8:
FIG. 8 illustrates a screen display configured to receive data parameters relating to creating an audiovisual work.

Step 206 also may comprise receiving user input specifying a start point of a song. In an embodiment, a user may upload or select a song or other digital audio media items, and the process may generate and provide the client computer 100 with a graphical display that includes a slider widget representing the length of the song in time. The user may manipulate the slider to select a start point of the song, and the process receives the selected slider location to determine the start point. FIG. 8 shows an example slider widget.

In step 208, input requesting creation of an audiovisual work is received. Step 208 may comprise receiving input selecting a "Create Video" button in a graphical user interface. As part of step 208 or other steps, the process of FIG. 2A may optionally receive other forms of input that provide additional data that the process can use later in determining how to render the audiovisual work. For example, at step 212 the process can optionally receive input specifying a re-ordering of the digital visual media items. Thus, the user could upload a number of digital visual media items in one order and then provide input for re-ordering the images into a second order on the file server after the images have been uploaded. In various embodiments, the input of step 208 is received from any of an application, system, or user. In such embodiments, audiovisual works can be automatically generated or generated in response to a signal from another application or system.

At step 208 the process also may provide a list of audiovisual works that are in progress for the current user.

At step 214, the process may optionally receive input identifying one or more key digital visual media items. For example, a user could specify that a particular shot is a key photo, so that the subsequent rendering process should give more emphasis or other special treatment to the identified shot. Thus, the user is able to flag one or more key photos for emphasis. In one embodiment, using the graphical user interface of client computer 100 the user can highlight or emphasize one or more key photos. Alternatively, one or more digital visual media items may have associated information that indicates that the images are key images.

In step 216, the process may optionally receive input identifying segment groupings of digital visual media items. Thus, the user might upload 20 digital visual media items and specify that the first four images are related as a first segment or group and that the remaining 16 are related as a second segment or group. Input about groupings can be used in subsequent process steps to favor modules that would allow the visual groupings to coincide with the song structure. For example, all images within groups are compared to nearby song changes or a new movement in the song structure. Then modules are selected that would allow these image grouping boundaries to fall on song structure boundaries, effectively giving a group of pictures a musical "section."

Identifying segment groupings also may include providing markers that delimit the groups, identifying a specified group as a background layer or foreground layer, identifying a specified group as associated with a particular part of a song, or providing other identifying information.

In step 218, the process may optionally receive input identifying a preferred style of audiovisual work. Additionally or alternatively, the input received at step 218 may specify a specific design module composition, or a name of a specific design module designer. Further, an audio media item may have style metadata associated with it and the process may automatically extract the style metadata.

In step 219, the process may optionally receive input providing overlay text that the user wants to display over one or more images. Additionally or alternatively, the text may comprise a title of the audiovisual work, description of the audiovisual work, a tag to attach to the end of the audiovisual work, lyrics displayed during a song, captions displayed during a song, etc. Further, the digital visual media items may have text information associated with them and the process may automatically extract the text information.

At step 221, the process may optionally retrieve data from an online site relating to the digital media items. For example, the process may use a connection to the Internet to contact a network server to obtain information based on the metadata extracted at step 207. Example online sources of information may include online databases such as CDDB, using online scraping to extract data from unorganized text or media that is in an online source, retrieving or receiving data from an online feed such as RSS, XML, or Atom data.

After each of steps 212-221, as shown at step 230, the process creates and stores metadata based on the input. The metadata based on the input provides the audiovisual creation system with cues about how to composite and render a finished audiovisual work. Further, using processes further described herein, the system can infer desirable characteristics for the finished audiovisual work based on the metadata, and thus the metadata can be used indirectly. Metadata stored at step 230 may comprise the input in unmodified form, or the input may be processed to ensure that the metadata is stored in canonical form or otherwise transformed. Further, the metadata created at step 230 may be inferred rather than explicitly defined by a user. For example, when the user specifies downloading digital visual media items from an online photo site, step 230 can comprise retrieving and storing captions that the user previously created at the online photo site for the digital visual media items that are downloaded. In addition, steps 212-219 represent only example sources and associations of metadata; other embodiments may use any of many other sources and associations of metadata.

In an embodiment, metadata processed at step 230 comprises machine- and human-exploitable information about data that generally uses a standard syntax and vocabulary. The metadata can be associated with any information entity described herein, including media files, a user, a project, design modules, a final audiovisual work, etc., and can be obtained from any of numerous sources. Thus, associations describe what metadata is associated with, and sources are locations from which metadata is obtained. In an embodiment, any or all such metadata may influence the selection of design modules that determine the appearance of a completed audiovisual work.

In an embodiment, metadata associated with a user may comprise age, gender, historical choices of media or text, personal musical and stylistic preferences, geographical location, economic standing, profession, etc. Metadata associated with audio media may comprise a song title, album, artist, year created, length, onsets, beats, song structure, or genre. Metadata associated with image media may comprise a palette, captions, width, height, orientation, image subject(s), points-of-interest, face locations, or hue/saturation/contrast/levels. Metadata associated with video media may comprise a palette, width, height, length, subject tracking, object locations, or zoom/pan speeds. Metadata associated with any data file may comprise size, date created, date modified, content-type, or format.

In an embodiment, metadata associated with a project may comprise associated keywords, source media album name, description, caption, genre/style/theme, geographical location, or event details.

In an embodiment, metadata associated with design modules may comprise keywords, acceptable range of beats per minute, usage statistics, popularity, module family, acceptable media, correlated musical genres, attack, decay, or genre/style.

In various embodiments, metadata can be obtained in a variety of ways from any of several sources. Example sources of metadata include media files, computer-generated sources, auxiliary sources, and user input. In an embodiment, metadata is obtained directly in or with a media file. Often, the metadata is contained in or with the media file according to industry standard metadata specifications or stored in metadata fields specific to the media container. The metadata may be directly associated with an entity, such as a user or project. In audio files, presently known metadata sources include ID3v2 or ID3v1 tags, APE, Lyrics3, RIFF, or VorbisComment information. In image files, presently known metadata sources include EXIF or XMP tags. In video files, metadata sources include RIFF, XMP, Quicktime, or Matroska information. Metadata sourced from users or projects may come from XML files, databases, etc.

In an embodiment, metadata may be generated programmatically or by humans through analysis of data or other metadata. For example, algorithmic extraction may be used for finding the tempo or song structure in an audio file. As another example, statistical extraction may be used, for example, to determine a user's preferred song choices based on historical choices.

In an embodiment, metadata may come from an auxiliary source or database of any kind. For example, metadata may be obtained from databases such as online CDDB, using an application programming interface (API) call to a third-party site, from a database on storage media like CD-ROM, etc. Further, metadata may be obtained by online scraping to extract data from unorganized text or media that is in an online source. Metadata may be obtained from an online feed such as RSS, XML, or Atom data.

In an embodiment, metadata may come from user input. For example, standard GUI inputs such as text fields, check boxes, radio buttons, and drop-downs may be used, or any other sensory/user interface may be used.

In various embodiments, the metadata that is processed at step 230 may have any of the preceding associations and may be obtained from any of the preceding sources. Thus, step 230 of FIG. 2A and FIG. 2B, described further herein, broadly represents processing metadata based on any source described herein and having any association.

In step 210, one or more attributes of the digital visual media items or the digital audio media items are modified. In an embodiment, step 210 involves media massaging that comprises, for example, downsampling digital visual media items and digital audio media items so that bandwidth and rendering time are not wasted. As an example, a digital audio media item that represents sampling a song at 250 Kb per second may be downsampled to 96 Kb per second. Alternatively, step 210 may comprise rotating or otherwise changing images. Media massaging may be performed on front end server 102 or using composition design unit 110.

At step 220, image analysis and video analysis is performed on the received digital visual media items. In an embodiment, image analysis comprises identifying a focus of an image, such as a face or other subject in the image, to assist subsequent rendering operations in determining zoom points, clipping masks, and similar values. In an embodiment, image analysis further comprises determining one or more characteristics of each digital visual media item, such as hue, saturation, brightness, palette, and contrast. Based on the characteristics determined for each image, subsequent rendering operations can apply one or more filters to one or more of the digital visual media items so that all digital visual media items in a completed audiovisual work are normalized to have a uniform look and feel. For digital still images, Exchangeable Image File Format (EXIF) metadata or tags may be extracted.

If the user provided a video file, then image analysis in step 220 also may comprise analyzing the video file to detect a subject of the video file, a focus of the video file, and characteristics of the video file, using the parameters described in the preceding paragraph with reference to digital still images. For video files, detecting a subject may include using motion tracking to determine panning, zooming, etc. For image analysis, available software libraries may be used, such as Intel's Open Computer Vision (OpenCV).

Image analysis may ensure that the subject of the photo is emphasized and not cut out; for example, a human head or face in a digital visual media item should not be cropped out. The process may also emphasize photos with humans by ensuring they are in foreground video effect compositions as opposed to background video effect compositions which would more likely comprise images of nature or landscapes.

At step 222, a music analysis process finds beats within the digital audio media items and/or song structure information to synchronize the digital visual media items to these points. Music analysis can comprise detecting beats, detecting tempo, detecting song structure, and determining genre or style information. Detecting song structure may involve detecting any one or more of a ramp-up period in the song, verses, choruses, bridge points, etc. Music analysis may involve onset detection and also determining the overall structure of the music or audio so that visual elements can be appropriately matched in later process steps. For example, if a song has a low-tempo, low amplitude verse characteristics but the chorus is loud and has a faster tempo, the process herein can dynamically pair appropriate visual elements with such intra-song shifts.

In an embodiment, if the music analysis process cannot find a specific tempo, beats or beat patterns—for example, the audio media item may comprise a spoken-word piece or other information that is not a song—then the music analysis process weights "beatless" modules higher, and arranges the modules chronologically. If the music analysis process has found a certain number of strong onsets above a threshold value, then the process attempts to arrange the modules so that module boundaries land on onset boundaries (to attempt to make them "pop" at audio energy shifts/bursts).

In an embodiment, the music analysis process relies on the genre information found for a certain piece to help aid module choices in the event the process cannot find a tempo or beats. For example, if the process could not find a tempo and determines that the genre is "audiobook" or "speech", the process will weight "beatless" modules higher. The process will always first attempt to find the tempo in case a piece of audio is incorrectly tagged.

Music analysis at step 222 also can comprise causing composition design unit 110 to connect to an online database of music information, such as Gracenote CDDB, to obtain genre information about the digital audio media items that a user has selected or uploaded. Any and all information relating to a particular song that is available in such external databases may be used in music analysis and stored as metadata for subsequent processing. Metadata also may be obtained using values that are encoded in the digital audio media items, for example, using the ID3 version 2 tag (ID3v2 tag) or similar mechanisms. ID3 is an information tagging method for MP3 digital audio files, developed by Martin Nilsson, Michael Mutschler, and other contributors.

After or as part of either or both of step 220 and step 222, additional metadata values may be created and stored at step 230, based on the results of the analysis operations. For example, focus points, image characteristics, beat points, and song structure values are stored at step 230. Further, in various embodiments, after step 220 or 222 control may transfer back to FIG. 2A to receive further input or for confirmation of various parameters. For example, after performing music analysis, the process may report a result to the user and request confirmation. As a specific example, such an embodiment could display a message indicating, "The song starts 23 seconds from the start of the file. Please confirm this start point."

At step 224, based on all the metadata that has been extracted, analyzed, generated, retrieved, and stored, and/or obtained from the design modules, one or more design modules are selected, the selected design modules are arranged to the digital audio media items, and the digital visual media items are assigned to the selected and arranged design modules. Step 224 may comprise selecting one or more design modules based on image orientation as portrait or landscape format, style information, song genre, user supplied keywords or style selection, metadata that has been created based on the analysis steps, and song structure information. Thus design module selection involves making inferences based on user-supplied data, data obtained from other sources, and/or metadata already associated in media items, and using data that the process has independently derived from the media items. Accordingly, design module selection occurs based at least in part on values that the process has inferred or implied from the media items and is not driven exclusively based on values that a user has explicitly provided or input.

Step 224 may comprise selecting multiple concurrent design modules to result in a more complex structure for the completed audiovisual work. For example, multiple design modules can be combined so that certain user-supplied digital visual media items appear in a foreground area of the completed audiovisual work, others appear in a subject area, and still other digital visual media items appear in the background. As another example, one design module can specify a color-wash effect that is layered over digital visual media items that are arranged in the background according to a different design module. Thus, the resulting audiovisual work is not merely a slide show, but incorporates concurrent active design modules and images.

Design modules also may be selected based on giving more weight to most frequently used design modules, user feedback, or other information.

As also indicated in step 224, the process assigns digital media items to the design modules. For example, media item placeholders in the design modules are replaced with user-supplied media items.

At step 226, the composition of design modules is assembled into a format that is compatible with a particular audiovisual rendering engine. The design modules may be re-timed to match the user-supplied song. In general, the design modules are populated with images and video that the user has provided and then matched to measure-level and song-level audio features. Step 226 may comprise creating and storing a Blender scene or script.

At step 228, the design modules are rendered with the digital audio media items and the beats to result in creating an audiovisual work that comprises the digital visual media items choreographed to the digital audio media items. The completed audiovisual work may resemble a music video and is not limited to a slideshow or photocast. Rendering may comprise programmatically invoking a rendering function of Blender and providing the scene file or script that was created at step 226.

In step 230, the completed audiovisual work is stored. In an embodiment, completed audiovisual works are stored on file server 108.

At step 232, the audiovisual work is provided to the client computer. Optionally, the system can provide the client computer with a link to a location of the audiovisual work stored on the file server. In an embodiment, rendering based on the metadata and other techniques described herein, and storage and delivery, are performed as offline processes so that the amount of time and processing power involved does not impact responsiveness of the system. Thus, in an embodiment no attempt is made to perform rendering in real time or to immediately deliver a completed audiovisual work to the user. If sufficient processing power is available, then a real-time approach could be used.

Step 232 also may comprise performing other post-processing features. For example, step 232 can comprise posting the finished audiovisual work to a social networking site, adding the audiovisual work to a public gallery, adding the audiovisual work to a private gallery associated with the then-current user, etc. Other features may comprise sharing the audiovisual work via email, sharing the audiovisual work by sending it to a cellular radiotelephone, or other transfer operations.

Thus, a process of automatically creating audiovisual works has been described. The process herein has numerous benefits and distinguishing characteristics in comparison to past approaches. The approach herein is not a guided editor, but rather takes much control away from the user. Once digital visual media items and digital audio media items have been uploaded, the approach herein uses artificial creativity to automatically create an audiovisual work by analyzing the digital visual media items and digital audio media items. The approach herein is not limited to determining a predominant recurring feature of a stored audio recording for purposes of determining when to transition to a next image. Instead, sophisticated design animation modules are used in conjunction with a rigorous analysis of digital audio media's structure so that the resulting audiovisual work is richer and more sophisticated.

The approach herein also can result in the completed audiovisual work having simulated three-dimensional, layered effects by combining multiple design modules that have been created in three-dimensional space. For example, the approach herein can cause the completed audiovisual work to display multiple digital visual media items at once in a particular frame, using a background layer, subject or featured layer, and foreground layer. Further, the approach herein analyzes songs to determine genre and selects appropriate modules to match the song based on the genre. The approach allows a user to input keywords or tags to influence the style of the modules used in the completed audiovisual work. The approach uses comprehensive analysis of images to generate metadata for use in selecting an appropriate design module.

Design modules may be created by parties other than the user and a service provider that implements the system of FIG. 1A, FIG. 1B. Thus, design modules may comprise a form of virtual property that is associated with a particular designer and that has a defined value. The design modules may be tagged with keywords that identify the designer, and the keywords may define a style that drives creation of completed audiovisual works.

In an embodiment, the present approach infers design module selecting, arranging and layering decisions based on the received digital visual media items and digital audio media items and all metadata obtained through the processes described herein, including metadata obtained from the design modules. In one embodiment of the present approach, it is possible for completed audiovisual works to be unique even when generated repeatedly using the same input digital visual media items and digital audio media items. The present approach supports creating a community of video effects module designers to create the design modules.

In an embodiment of the present approach, the processes and systems herein are responsible to select design modules. In an embodiment, the approach infers the types of design modules to be used based on the style, genre, and speed of the music and additional descriptor tags that the user inputs. In an embodiment, a user can select digital visual media items for emphasis and put them in key moments of output video. In an embodiment, the processes herein have primary responsibility to influence the duration of segments based on the tempo of the digital audio media items.

3.1 COMPOSER PROCESS

Steps 222, 230 may be implemented in a software Composer process or unit within composition design unit 110. In an embodiment, the Composer finds beats, measures, and larger structural elements within a digital audio media item file to aid the process of combining design modules and digital audio media items as performed by the Director as described in the next section. The Composer may use known algorithms for detecting onsets, identifying beats, determining measures and identifying patterns in measures, and provides data about measures, patterns, and weighted beat information to a Director process (further described herein) for use in selecting design modules. In an embodiment, existing third-party libraries may be used for performing audio analysis. An example library is the "FASTLab Music Analysis Kernel Library" available online at fastlabinc.com.

In this description, "onset" refers to the attack or beginning of a note or other musical event. "IOI" means an inter-onset interval, comprising a time between two onsets, which are not necessarily adjacent. "Beats" means onsets that fall on tempo boundaries. "Measure" means a repeating pattern of musical beats.

As an example of a process of audio analysis, the Composer implements the following steps:

1. Find onsets through a detection algorithm, such as a spectral flux detection algorithm, and record the averaged energy flux and amplitude at the onsets.

2. Discover beats using onset 101 clustering.

3. Re-adjust beat hypotheses. In an embodiment, the Composer does not assume that induced beats correspond to the exact time signature of the beats in the song. That is, the detected beats may be twice or half the speed of actual song beats. Using a table that maps genre values to beats-per-minute values, the Composer may double or halve the number of beats to reflect real-world knowledge about music types. As an example, entries in the genre table might indicate 80-160 BPM for Country music, 120-220 BPM for Techno music, etc. If the supplied beats do not fall within the lookup range for the genre of the music, the Composer may halve or double the number of beats to fall within the appropriate range.

4. Find measure boundaries and patterns through clustering. The boundaries and clustering may be based upon an onset/energy footprint, which comprises a pattern of the energy of the onsets throughout the measure.

5. Return data for each measure, comprising a measure pattern identifier, if found, for use in establishing measure clusters; beats including times and weight based on a correlation of flux energy and amplitude; and a normalized average energy footprint value. Returned data may be provided in an XML file that describes a song. TABLE 1 is an example XML file for a song.

TABLE 1

EXAMPLE MUSIC XML FILE

<beat-track song_id="12345">
  <start>0.810</start>
  <end>30.31</end>

TABLE 1-continued

EXAMPLE MUSIC XML FILE

```
    <measure patttern_id="1" weight=".403">
        <beat time="0.810" weight=".767" />
        <beat time="1.250" weight=".301" />
        <beat time="1.690" weight=".432" />
        <beat time="2.130" weight=".415" />
    </measure>
    <measure patttern_id="1" weight=".403">
        <beat time="2.580" weight=".500" />
        <beat time="3.020" weight=".502" />
        <beat time="3.460" weight=".504" />
        <beat time="3.900" weight=".431" />
    </measure>
    <measure patttern_id="1" weight=".403">
        <beat time="4.340" weight=".206" />
        <beat time="4.780" weight=".325" />
        <beat time="5.220" weight=".436" />
        <beat time="5.660" weight=".222" />
    </measure>
    <!--could not ascertain measure boundaries -->
    <measure>
        <beat time="6.110" weight=".237" />
        <beat time="6.540" weight=".236" />
        <beat time="6.990" weight=".562" />
        <beat time="7.430" weight=".442" />
        <beat time="7.870" weight=".352" />
        <beat time="8.310" weight=".325" />
        <beat time="8.750" weight=".311" />
        <beat time="9.190" weight=".631" />
        <beat time="9.630" weight=".326" />
        <beat time="10.070" weight=".442" />
        <beat time="10.520" weight=".332" />
        <beat time="10.960" weight=".232" />
        <beat time="11.400" weight=".677" />
        <beat time="11.840" weight=".632" />
        <beat time="12.280" weight=".653" />
        <beat time="12.720" weight=".632" />
        <beat time="13.160" weight=".556" />
        <beat time="13.600" weight=".532" />
        <beat time="14.050" weight=".423" />
        <beat time="14.490" weight=".332" />
        <beat time="14.930" weight=".422" />
    </measure>
    <measure patttern_id="2" weight=".755">
        <beat time="15.370" weight=".422" />
        <beat time="15.810" weight=".356" />
        <beat time="16.250" weight=".344" />
        <beat time="16.690" weight=".321" />
    </measure>
    <measure patttern_id="2" weight=".344">
        <beat time="17.130" weight=".233" />
        <beat time="17.570" weight=".442" />
        <beat time="18.020" weight=".502" />
        <beat time="18.460" weight=".511" />
    </measure>
    <measure patttern_id="2" weight=".932">
        <beat time="18.900" weight=".522" />
        <beat time="19.340" weight=".499" />
        <beat time="19.780" weight=".601" />
        <beat time="20.220" weight=".662" />
    </measure>
    <measure patttern_id="2" weight=".444">
        <beat time="20.660" weight=".532" />
        <beat time="21.100" weight=".311" />
        <beat time="21.540" weight=".219" />
        <beat time="21.990" weight=".225" />
    </measure>
    <measure>
        <beat time="22.430" weight=".445" />
        [other beat time and weight values omitted for brevity]
        <beat time="131.390" weight=".601" />
    </measure>
</beat-track>
```

Third party software commercial libraries and libraries available through open source software projects may be used for steps 1 through 3 of the Composer as described above.

3.2 DIRECTOR PROCESS

Step 224 and step 226 may be implemented in a software Director process in composition design unit 110. In an embodiment, a Director process selects design modules, assigns digital visual media items to the modules, and arranges the design modules to music based upon the metadata obtained in prior steps, and including metadata obtained from the design modules. In an embodiment, the Director receives as input style information, composition flow information, song data, and media constraints, each of which is described in the next section.

Style inputs assist the Director in selecting design modules based on text input. The input text is used to select appropriate design modules based on matching keyword data associated with the design module. The input text can be specifically provided by the user or parsed from metadata values extracted from the media items. Input text may comprise style keywords, text overlay data, etc. Metadata values extracted from the media items may comprise music genre or media captions parsed from within the media. Significant words in the input text are identified and mapped to design module keywords.

Composition flow inputs may comprise user-specified identification of key images for emphasis. Composition flow inputs also may comprise sequential grouping of scenes of related media items, and may be user-specified or determined through analysis using image comparison libraries.

Song data inputs may comprise measure pattern values and energy footprint values based on the Composer's music analysis process. Song data inputs also may comprise individual beat time values and weight values based on the Composer's music analysis process. Song data inputs also may comprise song start time values that are user supplied or automatically determined by the initial beat weight threshold and measure energy footprint values. Song data inputs also may comprise key moments in a song, such as a strong beat at the head of a measure with a correspondingly high energy footprint.

Media helpers comprise additional inputs that add intelligence to the process of assigning media items to design modules. Media helpers do not affect the process of selecting design modules, but add information for use in assigning media items to design modules. In an embodiment, media helpers include focal point selection values. In media items that are images, focal point selection values may comprise a subject of the image, which may be user supplied or analyzed using facial recognition libraries. In video media items, media helpers may comprise information identifying clips within the video media item that are essential to include or subjects to target.

Media constraints comprise certain inherent characteristics of the input media that will limit the choices that the Director can make. An example of a media constraint is information indicating whether a particular digital visual media item is in portrait orientation or landscape orientation.

In an embodiment, the Director uses all available metadata that has been extracted, analyzed, generated, retrieved, and stored, including metadata obtained from design modules, to aid in design module selecting and arranging. In an embodiment, the Director uses a weighted selection mechanism for determining design module-media pairings and for arranging the design modules to the song. Using a weighted selection mechanism enables the Director to find the best design module pairing given even minimal input data. In an embodiment, the Director performs design module selection using a design module tree, and performs a design module weighting and pruning phase, a composition structure phase, a tree traversal phase, and final project creation and rendering, each of which is now described.

1. Design module tree. In an embodiment, design modules are stored in a digital binary tree based on orientation as landscape or portrait, because orientation is the most fundamental constraint on pairing a media item to a design module. Each design module is attached to a leaf of the tree corresponding to the orientation of the images in the design module. Thus, all design modules that fit a certain image orientation will be grouped in the same leaf. Design modules that are not constrained by either orientation are linked to both branches.

2. Design module weighting and pruning phase. In an embodiment, before the Director arranges the design modules by traversing the design module tree, a weighting pass is made on the tree structure in which weights are assigned to design modules based on closeness to three factors: style keyword, usage statistics, and rating. If any resulting design module weight is less than a specified threshold, then the design module is pruned from the tree. Otherwise, the weight values are used during tree traversal to bias selection of design modules. The weight values then remain constant for the duration of creating a particular audiovisual work. Different audiovisual works will often have different weight values.

In an embodiment, style weighting is processed as follows. All design modules are tagged with style descriptor values. A mapping function calculates a weighting for the design module based on the degree of similarity between each design module's descriptors and the above-stated style inputs. Any form of determining similarity may be used and similarity determination is not limited to comparison of text values.

In an embodiment, usage weighting is processed as follows. All design modules are weighted based on past usage statistics stored in the database 104.

In an embodiment, rating weighting is processed as follows. Each design module has an associated rating value. Ratings are any other form of weighting that design module maintainers or authors want to apply or that are contributed through user feedback. For example, a high rating may indicate a skillfully executed design module, a crowd-pleasing design module, etc.

3. Composition structure phase. In an embodiment, the Director simplifies tree traversal by segmenting a composition of media items into sub-sections based on media group boundaries. Tree traversal is then executed on each sub-section or scene. Sub-sections are compared to the identified sections in the digital audio media items, and the Director attempts to correlate scene boundaries to media item group boundaries. For example, assume that a song has a verse-chorus-verse structure and has the following sectional boundaries:

| 4 measures | 2 measures | 4 measures |
M1        M2        M3

Assume further that the supplied image composition is as follows, in which "P" indicates an image in portrait orientation and "L" indicates an image in landscape orientation, and in which the vertical bar character indicates a media item group boundary:

PPLPLLPPP | LPLLLPP | LLPLLPLP | LLPLPPPPLPPL
9              7            8             12

The Director attempts to line up the media item group boundaries with the scene boundaries. For example, using an averaging algorithm, the Director might determine that groups 1 and 2 should be matched to musical section M1, scene 3 with M2, and scene 4 with M3. The Director then runs tree traversal on groups 1, 2, 3, and 4, and forces the traversal to map to the number of beats specified by the corresponding music selection.

If the Director is only provided with group boundaries, it will run the tree traversal on each of the sub-sections, ignoring any beat correlation. If the Director is only provided with music sections, however, the Director runs tree traversal on the entire image composition and will force design module boundaries to fall at music section boundaries.

4. Tree traversal. The design module tree is successively traversed to arrive at a design module arrangement that encompasses the entire image orientation composition. A new traversal will be started after each design module decision has been made. The result of tree traversal may be a non-linear arrangement of design modules.

Before each traversal, valid design modules are identified based on the remaining image orientations. For example, if the remaining photos are in the following configuration:

LPLLPLLLLPPPLPLLPL

Then all of the following leaves would be valid: L, LP, LPL, LPLL, . . . .

Each one of these leaves may have any number of design modules associated with it, each of which quality as appropriate for the remaining image orientation composition. Before choosing a design module, a temporary weighting is calculated for each of the valid design modules. The temporary weighting is based on factors particular to the present position in the image composition, based on both design modules already selected and future sequences. Example factors include characteristics of already selected design modules, forthcoming key moments in music, or images.

Characteristics of already selected design modules may be used as follows. The Director may weight design modules lower that use the same number of photos as the immediately preceding design module. The Director may weight design modules lower that use the same number of photos as a large number of the already-selected design modules. The Director may weight design modules lower that are in the same family.

Forthcoming key moments in digital visual media items and digital audio media items may be used as follows. For key events in a composition, either in the digital visual media items or digital audio media items, the Director attempts to set a soft break before the event. For images, the Director attempts to select design modules to force the key image to fall immediately after a design module boundary. For music, the Director favors a design module that consumes the correct number of beats, so that the next design module begins at a key moment beat. For both key images and moments, the Director favors design modules leading up with a high decay factor, and favors design modules that occur on the key image or moment with a high attack value.

A final design module decision is made by multiplying the temporary design module weighting by the global design module weighting and finally selected by a random number biased by the weightings.

5. Final project creation and rendering. After tree traversal, in an embodiment, the Director passes instructions about the project, including each design module with its associated images and in/out time points to a composition assembly process. A project may be described in an XML file that identifies design modules, images, and time points. TABLE 2 is an example XML project descriptor file.

TABLE 2

EXAMPLE PROJECT DESCRIPTOR FILE

```
<project id="12345" user_id="10000" key="ABC123">
  <song id="1234" content-type="audio/mp3" start="23.34"
  end="45.33" />
  <song id="6789" content-type="audio/wav" start="23.34"
  end="45.33" />
  <design module id="DT00001" tweak="L">
    <time_remap start="0.810" end="2.580" beat_count="4" />
    <image filename="IMG0001.jpg" />
  </design module>
  <design module id="DT00002" tweak="LLLL">
    <time_remap start="2.580" end="6.110" beat_count="8" />
    <image filename="IMG0002.jpg" />
    <image filename="IMG0003.jpg" />
    <image filename="IMG0004.jpg" />
    <image filename="IMG0005.jpg" />
  </design module>
  <design module id="DT00003" tweak="LLL">
    <time_remap start="6.110" end="7.870" beat_count="4" />
    <image filename="IMG0006.jpg" />
    <image filename="IMG0007.jpg" />
    <image filename="IMG0008.jpg" />
  </design module>
  <design module id="DT00004" tweak="LLLL">
    <time_remap start="7.870" end="11.400" beat_count="8" />
    <image filename="IMG0009.jpg" />
    <image filename="IMG0010.jpg" />
    <image filename="IMG0011.jpg" />
    <image filename="IMG0012.jpg" />
  </design module>
  <design module id="DT00005" tweak="AAAA">
    <time_remap start="11.400" end="13.160" beat_count="4" />
    <image filename="IMG0013.jpg" />
    <image filename="IMG0014.jpg" />
    <image filename="IMG0015.jpg" />
    <image filename="IMG0016.jpg" />
  </design module>
  <design module id="DT00006" tweak="AAAA" layer_index="1">
    <time_remap start="7.870" end="13.160" beat_count="4" />
    <image filename="IMG0013.jpg" />
    <image filename="IMG0014.jpg" />
    <image filename="IMG0015.jpg" />
    <image filename="IMG0016.jpg" />
  </design module>
</project>
```

3.3 EDITOR PROCESS

In an embodiment, the composition assembly unit 120 is implemented as an Editor process. The Editor process executes the Director process's instructions to assemble an audiovisual composition. The Editor process receives as input the Director process's arranging instructions, and according to these instructions prepares the modules, creates the composition consisting of modules and the audio, and causes the master composition to be rendered. The Director process's instructions may be received in the form of an XML file or direct commands. The Editor process comprises logic to aid in the execution of the Director process's instructions, but in an embodiment, the Editor process performs few or no creative decisions itself.

In an embodiment, the Editor process implements the following steps.

1. Module Preparation. Each of the modules is created in a specific third-party application program. Example application programs that can be used to create design modules include animation programs such as Blender, Maya, Adobe After Effects, or a proprietary system. In an embodiment, the Editor process comprises data specifying how to execute the following steps for the program type with which a design module was created. In various embodiments, the Editor process comprises methods for remotely controlling the originating program or libraries calls for directly manipulating the native file structure of the program.

For each design module, the Editor process replaces each media placeholder with imported media. The Editor process modifies the imported media based on specifications received from the Director. Such specifications may indicate that media should be cropped, resized, etc. The Editor process then renders the modules. If the Editor cannot directly manipulate the originating program or the structure of the program's project file, it can optionally pre-render the module with an alpha channel by simply replacing media placeholders on disc and forcing the program to render each module to a separate file.

2. Composition Generation. The Editor process imports audio data into a composition, imports modules into the composition, and modifies the imported modules or audio based on specifications received from the Director. For example, the specifications may indicate that the Editor should time remap modules to the beat timings of the audio.

3. Render Composition. The Editor process generates audiovisual output from the composition of design modules. In an embodiment, the Editor passes the completed composition to an appropriate render engine for the composition.

In an embodiment, the Editor process can receive a stream of input from the Director to create near real-time output. For example, the Director can receive smaller batches of input media and instructions and create an audiovisual composition stream. Thus, the process of rendering as described herein does not have to involve file creation; instead, rendering can comprise writing to a stream output. Such an approach could be used, for example, in automatic audiovisual creations at live events, to generate screensavers, etc.

In an embodiment, the Editor process may comprise a library that the Director process calls to create the final rendered video. Thus, the Editor process need not comprise to be a separate process and need not be hosted on a separate machine.

3.4 ONLINE SERVICE IMPLEMENTATION

In one embodiment, the system and processes described herein can be implemented as a consumer-oriented web service that automatically creates professional-quality videos from digital visual media items. In an embodiment, digital visual media items can be retrieved from any of several online digital photo sources. Examples include Flickr, KodakGallery, Snapfish, Shutterfly, SmugMug, Photobucket, etc. Alternatively, digital visual media items can be uploaded from the user's computer or obtained from an Internet site. For example, digital visual media items may be received from the results of a search using a search engine, images found otherwise on the Internet using browsing, a web address, or uploaded from a photo sharing site. A digital audio media item can comprise a song that is uploaded from the user's computer or downloaded from an online site associated with the provider of the production system 106 or delivered using front-end server 102.

In an embodiment, audiovisual works created using the processes herein are not slideshows, but dynamic, music-driven, and powerfully choreographed. The audiovisual works appear to be custom-made by professional editors. In an embodiment, no two works are the same, even if created from the same set of digital visual media items.

Figure 3:
FIG. 3 illustrates a screen display configured to receive uploaded digital visual media items.
Figure 5:
FIG. 5 illustrates a screen display configured to display retrieved digital visual media items.

In an embodiment, a user such as an individual at client computer 100 starts by selecting photos to be used in the audiovisual work, either uploaded from the user's computer or downloaded from a user-authenticated online photo storage site. FIG. 3 illustrates a screen display configured to receive uploaded digital visual media items. A user selects an Upload option, and selects photos from a desktop computer location and associates the photos with a box that is displayed in the screen display. FIG. 5 illustrates a screen display configured to display retrieved digital visual media items. The user can then reorder the photos within the box or remove a photo by selecting the photo and a Delete key.

Figure 4:
FIG. 4 illustrates a screen display configured to permit retrieving digital visual media items.

FIG. 4 illustrates a screen display configured to permit retrieving digital visual media items from an online service. The user may select an icon representing the online service, enter a username and password for an account at that online service, and then retrieve photos from the selected service.

Figure 6:
FIG. 6 illustrates a screen display configured to receive a selection of digital audio media item.
Figure 7:
FIG. 7 illustrates a screen display configured to receive uploaded digital audio media item.

The user then chooses a song to be used in the creation of the audiovisual work. In one embodiment, the digital audio media item is uploaded from the user's computer. FIG. 6 illustrates a screen display configured to receive a selection of digital audio media items. The screen display can be generated after the user of the client computer 100 navigates to music or song files that are stored on the client computer. Icons representing the music files are displayed in the screen display. The user can select an arrow icon to hear a brief excerpt of a song, can select a song in the display to cause it to be uploaded, or can select Finish to generate an audiovisual work using the selected song. FIG. 7 illustrates a screen display configured to receive an uploaded digital audio media item. The user can browse to a specified location in the client computer 100 and select a digital audio media item file at that location, then upload the digital audio media item. Alternatively, the client computer 100 may receive a list or set of digital audio media items from the front-end server 102 and display information about the digital audio media items. One or more of the displayed digital audio media items may be featured items and the user may select one of the displayed items for use.

The user then requests the service to create the audiovisual work. For example, a Finalize function may be selected in the graphical user interface. Other data parameters may be entered and stored in association with the completed audiovisual work. FIG. 8 illustrates a screen display configured to receive data parameters relating to creating an audiovisual work. Example parameters include a title for the completed audiovisual work, a description, a style, and a start point within the previously selected song.

In an embodiment, the user then can either wait for the final audiovisual work to be finished and displayed on the screen, or request the service to email a link for the final audiovisual work. In an embodiment, when the user waits, the service can display one or more video advertisements that are buffered to the user's computer during the rendering process. In an embodiment, the user can select the video advertisements to view them. In an embodiment, the service emails a link to the final audiovisual work to an email address that is registered in the system for the user.

In an embodiment, the service provider hosts the completed audiovisual work for a specified period of time. Any period of time may be used from a few minutes to years. In an embodiment, the service provider can upload the completed audiovisual work to other online video sites. In an embodiment, the service provider also stores individual digital visual media items that the user has uploaded for a specified period of time. Storing the individual digital visual media items enables the user to re-create the audiovisual work to obtain a different version, replace the music that was used, remove or re-order pictures, add new pictures, etc.

4.0 IMPLEMENTATION MECHANISMS

Hardware Overview

Figure 9:
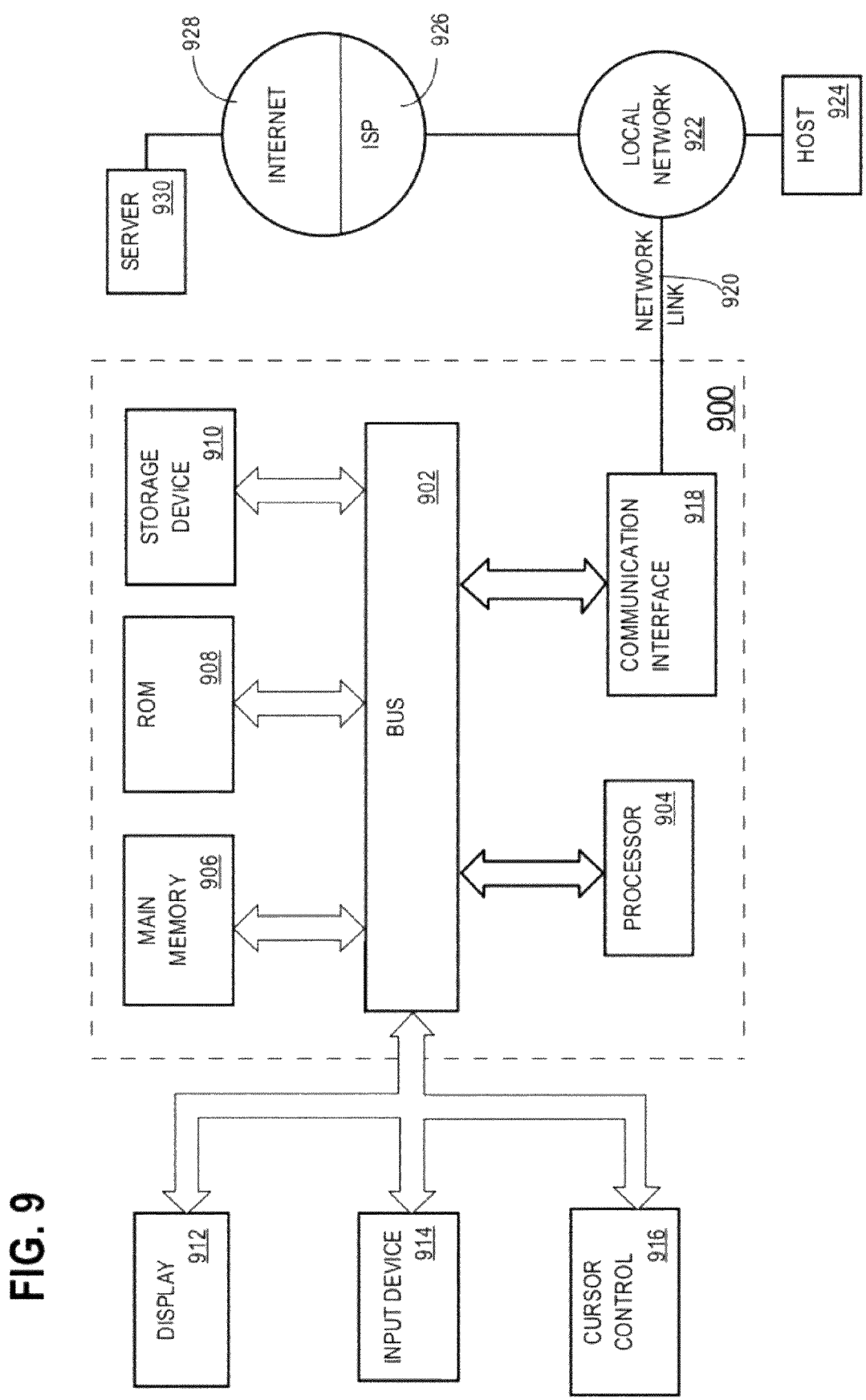
FIG. 9 illustrates a computer system upon which an embodiment may be implemented.

FIG. 9 is a block diagram that illustrates a computer system 900 upon which an embodiment of the invention may be implemented. Computer system 900 includes a bus 902 or other communication mechanism for communicating information, and a processor 904 coupled with bus 902 for processing information. Computer system 900 also includes a main memory 906, such as a random access memory ("RAM") or other dynamic storage device, coupled to bus 902 for storing information and instructions to be executed by processor 904. Main memory 906 also may be used for storing temporary variables or other intermediate information during execution of instructions to be executed by processor 904. Computer system 900 further includes a read only memory ("ROM") 908 or other static storage device coupled to bus 902 for storing static information and instructions for processor 904. A storage device 910, such as a magnetic disk or optical disk, is provided and coupled to bus 902 for storing information and instructions.

Computer system 900 may be coupled via bus 902 to a display 912, such as a cathode ray tube ("CRT"), for displaying information to a computer user. An input device 914, including alphanumeric and other keys, is coupled to bus 902 for communicating information and command selections to processor 904. Another type of user input device is cursor control 916, such as a mouse, trackball, stylus, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

The invention is related to the use of computer system 900 for automatically creating audiovisual works. According to one embodiment of the invention, automatically creating audiovisual works is provided by computer system 900 in response to processor 904 executing one or more sequences of one or more instructions contained in main memory 906. Such instructions may be read into main memory 906 from another computer-readable medium, such as storage device 910. Execution of the sequences of instructions contained in main memory 906 causes processor 904 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 904 for execution. Such a medium may take many forms, including but not limited to, non-volatile media, volatile media, and transmission media. Non-volatile media includes, for example, optical or magnetic disks, such as storage device 910. Volatile media includes dynamic memory, such as main memory 906. Transmission media includes coaxial cables, copper wire and fiber optics, including the wires that comprise bus 902. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 904 for execution. For example, the instructions may initially be carried on a magnetic disk of a remote computer. The remote computer can load the instructions into its dynamic memory and send the instructions over a telephone line using a modem. A modem local to computer system 900 can receive the data on the telephone line and use an infrared transmitter to convert the data to an infrared signal. An infrared detector can receive the data carried in the infrared signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network ("ISDN") card or a modem to provide a data communication connection to a corresponding type of telephone line. As another example, communication interface 918 may be a local area network ("LAN") card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider ("ISP") 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are exemplary forms of carrier waves transporting the information.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918. In accordance with the invention, one such downloaded application provides for automatically creating audiovisual works as described herein.

The received code may be executed by processor 904 as it is received, and/or stored in storage device 910, or other non-volatile storage for later execution. In this manner, computer system 900 may obtain application code in the form of a carrier wave.

5.0 EXTENSIONS AND ALTERNATIVES

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

The invention claimed is:

1. In a system comprising one or more computing devices, a method for automatically generating an audiovisual work, the method comprising:
    inferentially selecting one or more design animation modules from among a plurality of design animation modules to use to generate an audiovisual work based at least upon all of:
        (a) one or more first metadata values reflecting one or more detected visual characteristics of at least one of one or more digital visual media items,
        (b) one or more second metadata values reflecting one or more detected audio characteristics of at least one of one or more digital audio media items and comprising beat timing information pertaining to the at least one digital audio media item, and
        (c) one or more third metadata values associated with at least one of the plurality of design animation modules and comprising beat timing information pertaining to the at least one design animation module;
    wherein each design animation module of the plurality of design animation modules is an independent interchangeable unit that can be combined with other design animation modules of the plurality of design animation modules to form different audiovisual works;
    wherein the one or more selected design animation modules comprises the at least one design animation module;
    wherein inferentially selecting the at least one design animation module comprises comparing the beat timing information of the one or more second metadata values pertaining to the at least one digital audio media item to the beat timing information of the one or more third metadata values pertaining to the at least one design animation module;
    wherein the at least one design animation modules comprises a specification of an animation scene;
    assigning the at least one digital visual media item to the at least one design animation module including incorporating the at least one digital visual media item into the specification of the animation scene; and
    generating the audiovisual work using the one or more selected design animation modules, the one or more digital visual media items, and the one or more digital audio media items;
    wherein the method is performed by the one or more computing devices.

2. The method of claim 1:
    wherein at least one design animation module of the one or more selected design animation modules comprises at least one visual media item placeholder for eventual replacement by a digital visual media item; and wherein generating the audiovisual work comprises replacing the at least one digital visual media item placeholder with a digital visual media item of the one or more digital visual media items.

3. The method of claim 1, further comprising:
responsive to successfully generating the audiovisual work, sending a notification to a user that the audiovisual work has been successfully generated; and
wherein the user receives the notification at a computing device of the user.

4. The method of claim 1, further comprising:
responsive to successfully generating the audiovisual work, sending a notification to a user that the audiovisual work has been successfully generated; and
wherein the user receives the notification at a mobile phone of the user.

5. The method of claim 1, further comprising:
responsive to successfully generating the audiovisual work, sending an e-mail notification to a user that the audiovisual work has been successfully generated.

6. The method of claim 1, further comprising:
responsive to successfully generating the audiovisual work, sending a notification to a user that the audiovisual work has been successfully generated; and
wherein the notification comprises a link for downloading the generated audiovisual work.

7. The method of claim 1, further comprising:
prior to inferentially selecting the one or more design animation modules, receiving a specification of an online service from which the one or more digital visual media items can be downloaded; and downloading the one or more digital visual media items from the online service responsive to receiving the specification.

8. The method of claim 1, further comprising:
prior to inferentially selecting the one or more design animation modules, receiving a specification of an online service from which the one or more digital audio media items can be downloaded; and downloading the one or more digital audio media items from the online service responsive to receiving the specification.

9. The method of claim 1, further comprising:
prior to inferentially selecting the one or more design animation modules, receiving from a user's computing device a request to generate the audiovisual work; and
while generating the audiovisual work, causing a video advertisement to be displayed at the user's computing device.

10. The method of claim 1, prior to inferentially selecting the one or more design animation modules, receiving from a user's computing device the one or more digital visual media items.

11. The method of claim 1, prior to inferentially selecting the one or more design animation modules, receiving from a user's computing device the one or more digital audio media items.

12. The method of claim 1, wherein the one or more detected visual characteristics of the at least one digital visual media item comprises a digital image orientation of the at least one digital visual media item; and wherein the one or more third metadata values associated with the at least one design animation module indicate a digital image orientation that a digital visual media item placeholder of the at least one design animation module is capable of accepting.

13. The method of claim 1, further comprising re-timing one or more of the one or more selected design animation modules to one or more of the one or more digital audio media items.

14. The method of claim 1, wherein at least one of the one or more digital visual media items is a digital video.

15. The method of claim 1, wherein the one or more detected audio characteristics of the at least one digital audio media item include beat points and song structure attributes of the at least one digital audio media item.

16. The method of claim 1, wherein the one or more detected audio characteristics of the at least one digital audio media item include a ramp-up period, climactic point, verse, chorus, bridge, genre, or style of the at least one digital audio media item.

17. The method of claim 1, wherein the one or more detected visual characteristics of the at least one digital visual media item include a focal point, hue, saturation, orientation, brightness, or contrast of the at least one digital visual media item.

18. The method of claim 1, further comprising:
obtaining one or more text values associated with a collection of the one or more digital visual media items; and
inferentially selecting the one or more design animation modules of the plurality of design animation modules to use to generate the audiovisual work based at least upon all of (a), (b), (c), and the one or more text values.

19. The method of claim 1, further comprising:
obtaining a preferred style for the audiovisual work; and
inferentially selecting the one or more design animation modules of the plurality of design animation modules to use to generate the audiovisual work based at least upon all of (a), (b), (c), and the preferred style.

20. The method of claim 1, further comprising:
obtaining a preferred style for the audiovisual work;
obtaining a genre of the at least one digital audio media item; and
inferentially selecting the one or more design animation modules of the plurality of design animation modules to use to generate the audiovisual work based at least upon all of (a), (b), (c), the preferred style, and the genre.

21. The method of claim 1, wherein the one or more selected design animation modules comprises a plurality of selected design animation modules; and wherein generating the audiovisual work comprises layering at least two of the plurality of selected design animation modules.

22. The method of claim 1, wherein each of the plurality of design animation modules is generated using design animation software.

23. The method of claim 1,
wherein one or more of the one or more selected design animation modules comprise one or more digital visual media item placeholders;
wherein each placeholder of the one or more digital visual media item placeholders accepts a range of digital visual media items;
wherein the one or more selected design animation modules that comprise the digital visual media item placeholders are associated with one or more particular metadata values, each particular metadata value of the one or more particular metadata values corresponding to one digital visual media item placeholder of the one or more digital visual media item placeholders;
wherein each particular metadata value of the one or more particular metadata values indicates a range of digital visual media items that the corresponding digital visual media item placeholder accepts.

24. The method of claim 23:
wherein each of the one or more digital visual media items is a digital image;

wherein each particular metadata value of the one or more particular metadata values indicates an image orientation of digital visual media items that the corresponding digital visual media item placeholder accepts.

25. The method of claim 1, wherein at least one of the one or more selected design animation modules comprises one or more digital visual media item placeholders that, according to the at least one selected design animation module, are animated in the animation scene.

26. The method of claim 25, wherein generating the audiovisual work comprises replacing the one or more digital visual media item placeholders with one or more of the one or more digital visual media items.

27. The method of claim 1, wherein:
the beat timing information pertaining to the at least one digital audio item comprises one or more beat times and one or more associated weights; and
the beat timing information pertaining to the at least one design animation module specifies a number of beats.

28. The method of claim 1, wherein:
(c) the one or more third metadata values associated with the at least one design animation module comprises acceptable digital visual media item information pertaining to the at least one design animation module indicating one or more visual characteristics of digital visual media items acceptable for the at least one design animation module; and
inferentially selecting the at least one design animation module comprises comparing the acceptable digital visual media item information to one or more of the one or more first metadata values.

29. One or more non-transitory computer-readable media storing instructions which, when executed by one or more computing devices, cause performance of a method for automatically generating an audiovisual work, the method comprising:
inferentially selecting one or more design animation modules from among a plurality of design animation modules to use to generate an audiovisual work based at least upon all of:
(a) one or more first metadata values reflecting one or more detected visual characteristics of at least one of one or more digital visual media items,
(b) one or more second metadata values reflecting one or more detected audio characteristics of at least one of one or more digital audio media items and comprising beat timing information pertaining to the at least one digital audio media item, and
(c) one or more third metadata values associated with at least one of the plurality of design animation modules and comprising beat timing information pertaining to the at least one design animation module;
wherein each design animation module of the plurality of design animation modules is an independent interchangeable unit that can be combined with other design animation modules of the plurality of design animation modules to form different audiovisual works;
wherein the one or more selected design animation modules comprises the at least one design animation module;
wherein the at least one design animation modules comprises a specification of an animation scene;
wherein inferentially selecting the at least one design animation module comprises comparing the beat timing information of the one or more second metadata values pertaining to the at least one digital audio media item to the beat timing information of the one or more third metadata values pertaining to the at least one design animation module;
assigning the at least one digital visual media item to the at least one design animation module including incorporating the at least one digital visual media item into the specification of the animation scene; and
generating the audiovisual work using the one or more selected design animation modules, the one or more digital visual media items, and the one or more digital audio media items.

30. A system for interfacing with an online service for automatically generating audiovisual works, the system comprising:
one or more non-transitory computer-readable media storing downloadable instructions which, when downloaded and executed by a computing device, allow a user of the computing device to provide the online service an indication of one or more digital visual media items, provide the online service an indication of one or more digital audio media items, and request the online service to generate an audiovisual work based on the one or more digital visual items and the one or more digital audio media items;
wherein the online service, responsive to receiving a request from the computing device to generate the audiovisual work, is configured to inferentially select one or more design animation modules from among a plurality of design animation modules to use to generate the audiovisual work based at least upon all of (a) one or more first metadata values reflecting one or more detected visual characteristics of at least one of one or more digital visual media items, (b) one or more second metadata values reflecting one or more detected audio characteristics of at least one of one or more digital audio media items and comprising beat timing information pertaining to the at least one digital audio media item, and (c) one or more third metadata values associated with at least one of the plurality of design animation modules and comprising beat timing information pertaining to the at least one design animation module;
wherein each design animation module of the plurality of design animation modules is an independent interchangeable unit that can be combined with other design animation modules of the plurality of design animation modules to form different audiovisual works;
wherein the one or more selected design animation modules comprises the at least one design animation module;
wherein the at least one design animation modules comprises a specification of an animation scene; and
wherein the online service is further configured to:
inferentially select the at least one design animation module including compare the beat timing information of the one or more second metadata values pertaining to the at least one digital audio media item to the beat timing information of the one or more third metadata values pertaining to the at least one design animation module
assign the at least one digital visual media item to the at least one design animation module including incorporating the at least one digital visual media item into the specification of the animation scene, and
generate the audiovisual work using the one or more selected design animation modules, the one or more digital visual media items, and the one or more digital audio media items.

* * * * *